United States Patent Office 3,210,371
Patented Oct. 5, 1965

3,210,371
PROCESS FOR MANUFACTURING IMIDAZOLINES
OR BISIMIDAZOLINES
Natsuo Sawa, Kazuhiro Nagai, Shigeru Kishizoe, Yoichi Tsujino, Mitsumasa Kuriyama, and Tadao Shimamura, Kitajima-machi, Itano-gun, Tokushima Prefecture, Japan, assignors to Toho Rayon Kabushiki Kaisha, Chuo-ku, Tokyo, Japan, a corporation of Japan
No Drawing. Filed May 28, 1962, Ser. No. 197,908
Claims priority, application Japan, July 18, 1961, 36/25,629; Nov. 7, 1961, 36/39,665
4 Claims. (Cl. 260—309.6)

The present invention relates to a process for manufacturing imidazolines or bisimidazolines by synthesizing aliphatic 1,2-diamine with mononitrile or polynitrile respectively under the catalytic action of elementay sulfur or sulfur liberating sulfur compounds.

The reactions of the present invention proceed generally according to the following equations:

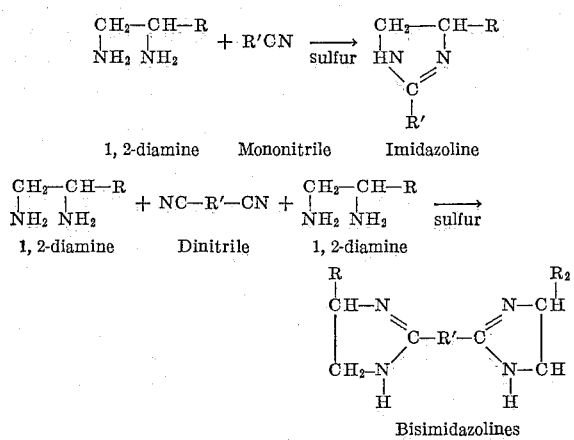

In the above formula R represents hydrogen atom or methyl group and R' represents aliphatic hydrocarbon group or aromatic hydrocarbon group.

A general procedure for synthesizing of the above-mentioned compounds of the present invention is as follows:

The diamine and nitrile of approximately equivalent amount are mixed together in a reaction vessel equipped with a reflux-condenser, then a small amount of elementary sulfur or sulfur liberating sulfur compound is added. As the resulting mixture is warmed slowly on a water-bath, the reaction begins to proceed, with a vigorous evolution of ammonia gas followed. The reaction temperature is then raised up to approximately 100° C. and maintained for several hours until the evolution of gas ceases.

The reaction products thus obtained are purified usually by distillation when they are liquid and, by recrystallization or sublimation when they are solid. Traces of sulfur which still remain in the products purified as in the above-mentioned way are easily removed off by the following procedure: The melted product which contains traces of sulfur is stirred with a small amount (approx. 2% by weight) of zinc powder or iron powder at somewhat higher temperature than its melting point, then filtered while hot.

Without sulfur or sulfur liberating sulfur compound the above-mentioned reactions do not proceed. Even if the reactions may proceed without sulfur, the reactions may not be practical because both the velocity and the yield of the reactions are remarkably low.

Some of physical and chemical properties of imidazolines and bisimidazolines which are obtained by the reactions of the present invention are as follows:

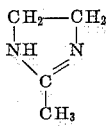

2-methyl-imidazoline

Colorless crystal, M.P. 101–3° C. (from benzene), B.P. 73° C./2 mm. Hg, soluble in water and usual org. solvents. Picrate: M.P. 204–5° C. (from water).

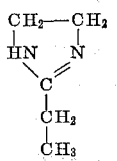

2-ethyl-imidazoline

Colorless liquid, B.P. 109–110° C./15 mm. Hg, soluble in water and usual org. solvents. Picrate: M.P. 135.5–6.0° C. (from methanol).

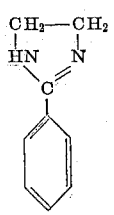

2-phenyl-imidazoline

Colorless crystal, M.P. 102–3° C. (from benzene), soluble in water and usual org. solvents. Picrate: M.P. 238.5–9.0° C. (from methanol).

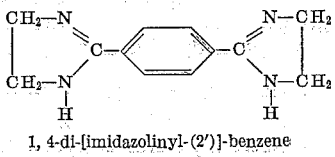

1, 4-di-[imidazolinyl-(2′)]-benzene

Colorless crystal, M.P. 296–7° C. (from DMF) insoluble in water. N percent 26.23 (theo. 26.15%).

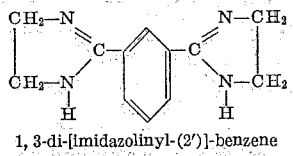

1, 3-di-[imidazolinyl-(2′)]-benzene

Colorless crystal, M.P. 242–3° C. (from methanol), insoluble in water, soluble in methanol. N percent 26.09 (theo. 26.15%).

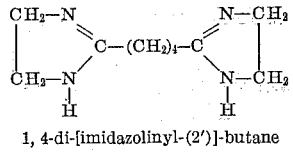

1, 4-di-[imidazolinyl-(2′)]-butane

Colorless crystal, M.P. 215–6° C. (from methanol+acetone), soluble in water and usual org. solvents. N percent 28.85 (theo. 28.84%).

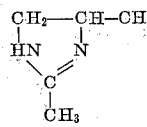

2, 4-dimethyl-imidazoline

Colorless liquid, B.P. 107.5–8.0° C./15 mm. Hg, soluble in water and usual org. solvents. Picrate: M.P. 141.0–1.5° C. (from methanol).

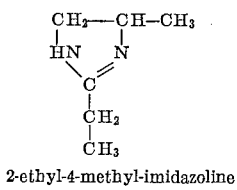

2-ethyl-4-methyl-imidazoline

Colorless liquid, B.P. 110.5–111.0° C./15 mm. Hg, soluble in water and usual org. solvents. Picrate: M.P. 104.5–5.5° C. (from methanol).

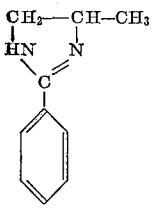

2-phenyl-4-methyl-imidazoline

Colorless crystal, B.P. 182–3° C./15 mm. Hg, insoluble in water. Picrate: M.P. 182.5–3.0° C. (from methanol).

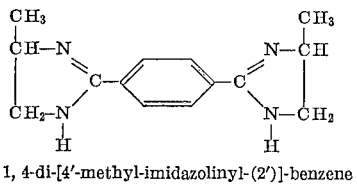

1, 4-di-[4'-methyl-imidazolinyl-(2')]-benzene

Colorless crystal, M.P. 226° C. (from ethanol), insoluble in water. N percent 23.23 (theo. 23.12).

Moreover, the reaction of the present invention can be applied to polyacrylonitrile polymer which is one typical polynitrile compound. For example, polyacrylonitrile fiber in which a few nitrile groups are converted to the imidazoline groups in the procedure above-mentioned can be easily dyed with acid dyes without any deformation of the fiber.

Moreover, particularly, the fiber is immersed in the 1,2-diamines into which a small amount of elementary sulfur or sulfur liberating sulfur compound is previously dissolved, heated at approximately 100° C. for a short interval of time, washed with water to remove the 1,2-diamines off and then dried. The resulted fiber can be easily dyed with acid dyes. In the procedure above-mentioned, however, the long reaction interval of time, which is satisfactorily enough to the complete formation of imidazolines, may cause the fiber to dissolve into the 1,2-diamines according to the formation of polyvinyl-imidazolines which are soluble in water and can not be converted into the previous substance, namely, polyacrylonitrile.

The chemical reaction of the procedure above-mentioned is shown as follows:

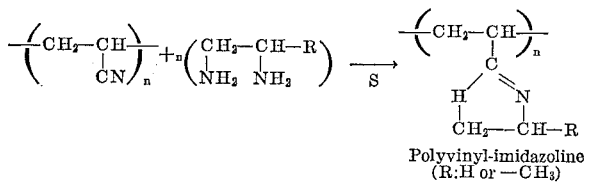

Polyvinyl-imidazoline
(R:H or —CH₃)

Besides, the same reaction can be applied to cyanoethyl cellulose fiber in order to obtain a new cellulose fiber which is easily dyed with acid dyes according to the formation of imidazoline groups from cyano groups in the cyanoethyl cellulose. More particularly, the fiber is treated in the same procedure as in the case of polyacrylonitrile. Thus obtained imidazolinyl-(2)-cellulose fibers are easily dyed with acid dyes. The reaction is shown as follows:

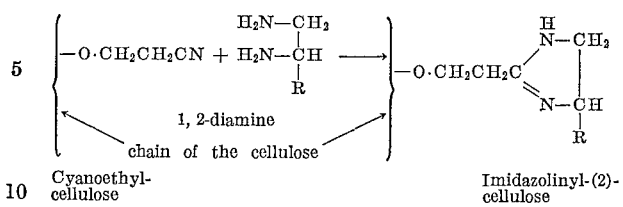

Cyanoethyl-cellulose    1, 2-diamine   Imidazolinyl-(2)-cellulose
chain of the cellulose

Example 1

Ethylene-diamine (20.0 gm.), acetonitrile (13.7 gm.) and elementary sulfur (0.5 gm.) were mixed and heated on a water-bath under reflux until the evolution of ammonia gas ceased. The time for reaction was approximately two hours. The resulted mixture was added with zinc powder (5.0 gm.), heated on a water-bath for one hour, filtered while hot and then purified by a distillation. Purified 2-methyl-imidazoline (24.6 gm., B.P.$_2$ 73° C.) was obtained. Theoretical yield based on the diamine was 88%.

Example 2

Ethylenediamine (20.0 gm.), propionitrile (40.0 gm.) and elementary sulfur (1.0 gm.) were mixed and reacted similarly as in Example 1 for 5 hours, then the reaction mixture was treated like in Example 1. 2-ethyl-imidazoline (25.2 gm., B.P.$_{15}$ 105–1113° C.) was obtained (77% yield).

Example 3

Ethylenediamine (2.0 gm.), benzonitrile (1.5 gm.) and elementary sulfur (0.3 gm.) were reacted similarly as in Example 1 for 2 hours. 2-phenyl-imidazoline (1.0 gm., M.P. 102–3° C.) was obtained (47% yield).

Example 4

Ethylenediamine (30.0 gm.), 1,3-dicyanobenzene (32.0 gm.) and elementary sulfur (0.5 gm.) were reacted together similarly as in Example 1 for 3 hours, and the product thus obtained was treated with concentrated hydrochloric acid to obtain its hydrochloride, of which aqueous solution was then filtered and alkalized with sodium-carbonate. 1,3-di - [imidazolinyl - (2')] - benzene (30.0 gm.; M.P. 242–3° C.) was separated from the alkalized solution (56% yield).

Example 5

Ethylenediamine (30.0 gm.), 1,4-dicyanobenzene (16.0 gm.) and elementary sulfur (0.5 gm.) were reacted together similarly as in Example 4 for one hour. 1,4-di-[imidazolinyl - (2')] - benzene (19.1 gm.) was obtained (M.P. 296–7° C.; 71% yield).

Example 6

Ethylenediamine (48.5 gm.), adiponitrile (29.1 gm.) and elementary sulfur (0.5 gm.) were reacted together similarly as in Example 4 for 4 hours. 1,4-di-[imidazolinyl-(2')]-butane (M.P. 215–216° C.) (38.5 gm.) was obtained (72% yield).

Example 7

1,2-diaminopropane (20.0 gm.), acetonitrile (11.1 gm.) and sulfur (1.0 gm.) were reacted together similarly as in Example 1 for 4 hours. 2,4 - dimethyl-imidazoline (21.4 gm.) B.P.$_{15}$ 105–8° C. was obtained (81% yield).

Example 8

1,2-diaminopropane (20.0 gm.), propionitrile (14.9 gm.) and elementary sulfur (0.5 gm.) were reacted together similarly as in Example 1 for 8 hours. 2-ethyl-4-methyl-imidazoline (19.3 gm.) was obtained (B.P.$_{15}$ 108–112° C., 64% yield).

*Example 9*

1,2-diaminopropane (16.0 gm.) benzonitrile (22.1 gm.) and sulfur (0.5 gm.) were reacted similarly as in Example 1 for 2 hours. 2-phenyl-4-methyl-imidazoline (11.3 gm.) was obtained (B.P.$_{15}$ 182–3° C.; 33% yield).

*Example 10*

1,2-diaminopropane (55.0 gm.), 1,4 - dicyanobenzene (32.0 gm.) and sulfur (0.5 gm.) were reacted together similarly as in Example 4 for 3 hours. 1,4-di-[4′-methyl-imidazolinyl-(2′)] - benzene (58.0 gm.) was obtained (M.P. 226° C., 96% yield).

*Example 11*

1,2-diaminopropane (37.0 gm.), adiponitrile (27.0 gm.) and sulfur (0.5 gm.) were reacted similarly as in Example 4 for 9 hours. 1,4-di-[4′-methyl-imidazolinyl-(2′)]-butane (25.5 gm.) was obtained (46% yield).

*Example 12*

1,2-diaminopropane (20.0 gm.), acetonitrile (11.0 gm.) and sulfur (0.5 gm.) were reacted for 3 hours at 150° C. in a stainless-steel autoclave and the reaction product was treated similarly as in Example 1. 2,4-dimethyl-imidazoline (16.3 gm.) was obtained (61% yield).

*Example 13*

Polyacrylonitrile fiber (0.5 gm.) containing 90% acrylonitrile and 10% methylacrylate, ethylenediamine (50.0 gm.) and sulfur (0.1 gm.) were reacted at 60–90° C. for 15 minutes in a round-flask. Next the fiber was washed with water, dried, immersed in toluene at room temperature, washed again with water, and then dried. The fiber thus resulted can be easily dyed with acid dye "Solar Brill Scarlet 3R (C.I. Acid Red 18)" boiled for 30 minutes under dye concentration of 2% based on the weight of the fiber and bath ratio of 1:100; exhaustion of which was 100% and the fastness to light of which was above 5 degrees, that is, completely unchanged. When sulfur was not added in the above procedure, dyeability of the resulted fiber was only 30%.

*Example 14*

The same polyacrylonitrile fiber (0.5 gm.) as used in Example 13, 90% aqueous solution (50.0 gm.) of ethylenediamine and sulfur (0.1 gm.) were similarly reacted together at 60–90° C. for 15 minutes. The fiber resulted in the same procedure as in Example 13 can be dyed with acid dye "Solar Brill Scarlet 3R (C.I. Acid Red 18)" under the similar conditions as in Example 13; exhaustion of which was 90% and the light-fastness of which was above 5 degrees, that is, completely unchanged. When sulfur was not added, dyeability of the fiber was as low as only contamination.

*Example 15*

Rayon of H.W.M. type or "polynosic type," which was more stable in alkali than rayons of other types, was immersed in 1% aqueous solution of sodium hydroxide at 20° C. for 1 hour, compressed until the content of the solution of the resulted fiber was reduced to twice of the weight of the original fiber. Thus resulted rayon was then reacted at 50° C. in excess of acrylonitrile for 30 minutes in order to be converted to cyanoethyl-cellulose rayon. N-content of which was 5%. The rayon cyanoethylated as above was then reacted with excess of ethylenediamine under the catalytic action of a small amount of elementary sulfur at 90° C. for 1 minute. The resulting rayon can be easily dyed with acid dye "Du Pont Mill Red SUB" in good tint. When addition of sulfur was not made in the above procedure, the resulting rayon was impossible to be dyed.

*Example 16*

Polyacrylonitrile powder (7.2 gm.) and 1,2-diaminopropane (10.0 gm.) in which sulfur (1.0 gm.) was dissolved previously were reacted on a water-bath for 4 hours. Excess of the diamine must be removed from the resulting mixture by vacuum condensation in order to obtain the product "polyvinyl-imidazoline" which was easy-soluble in excess of the diamine. The resulted polyvinyl-imidazoline was a polymer substance easy-soluble in water as well as methanol, the solution of which, particularly aqueous solution, looks like a paste and behaves as a strong base.

*Example 17*

A mixture of 20.0 gm. ethylene-diamine and 13.7 gm. acetonitrile was added with 0.5 gm. phosphorous pentasulfide ($P_2S_5$) and heated on a hot water bath for 3.5 hours under reflux with vigorous evolution of ammonia gas, until the reaction ceased. The product was recrystallized from benzene and 20.2 gm. 2-methyl-imidazoline was obtained. (The yield was 72%.)

*Example 18*

A mixture of 20.0 gm. ethylene-diamine and 18.3 gm. propionitrile was heated on a hot water bath under reflux together with 0.5 gm. phosphorous pentasulfide for 3.5 hours, the reaction was continued with vigorous evolution of ammonia gas, until the reaction ceased.

24.6 gm. 2-ethyl-imidazoline was obtained from the product thus resulted through distillation under reduced pressure. (The yield was 75%.)

*Example 19*

20.0 gm. ethylene diamine was mixed with 18.3 gm. propionitrile and the mixture was reacted together after 0.5 gm. sulfur chloride ($S_2Cl_2$) was added similarly as in Example 1 and 15.1 gm. 2-ethyl imidazoline was obtained after the 3.5 hours of reaction. (The yield was 46%.)

*Example 20*

20.0 gm. 1,2-diaminopropane was mixed with 11.1 gm. acetonitrile and reacted for 4 hours similarly as in Example 1 after 1.0 gm. phosphorous pentasulfide was added, and 20.6 gm. 2,4-dimethyl-imidazoline was obtained. (The yield was 78%.)

*Example 21*

20.0 gm. ethylene-diamine was mixed with 1.5 gm. benzonitrile and the mixture was then reacted with 0.3 gm. phosphorous pentasulfide added for two hours similarly as in Example 1. 0.9 gm. 2-phenyl-imidazoline was obtained. (The yield was 42%.)

*Example 22*

30.0 gm. ethylene-diamine was mixed with 32.0 gm. 1,3-dicyanobenzene. Then, the resulting mixture was reacted with 0.5 gm. phosphorous pentasulfide added for 3 hours, similarly as in Example 1. 27.0 gm. 1,3-di-[imidazonyl-(2′)]-benzene was obtained. The yield was 50%).

*Example 23*

30.0 gm. ethylene-diamine was mixed with 16.0 gm. 1,4-dicyanobenzene. The resulting mixture was reacted with 0.5 gm. sulfur chloride added for 1 hour similarly as in Example 1 and 17 gm. 1,4-di-[imidazolinyl-(2′)]-benzene was obtained. (The yield was 64%.)

*Example 24*

48.5 gm. ethylene-diamine was mixed with 29.1 gm. adiponitrile, and the resulting mixture was reacted with 0.5 gm. sulfur chloride added for 4 hours similarly as in Example 1. 34.5 gm. 1,4-di-[imidazolinyl-(2′)]-butane was obtained. (The yield was 65%.)

*Example 25*

0.5 gm. copolymer fiber comprising 90% acrylonitrile and 10% methyl acrylate was reacted with 50 gm. ethylene diamine and 0.3 gm. phosphorous pentasulfide for 15 minutes in liquid state at 60–90° C. under heating. The fiber was then washed with water and dried. Furthermore, the fiber was dipped into toluene at room temperature and washed with water and dried. The fiber obtained showed a dyeability of 100% when boiled with acid dyestuff "Solar Brill Scarlet 3R 2% (O.W.F.)" for 30 minutes with a bath ratio of 1:100. In this case, when phosphorous pentasulfide was not added, the dyeability was only 30% and the fastness to light was above the class 5.

*Example 26*

0.5 gm. of the same acrylic fiber as that described in Example 25 was reacted for 15 minutes under heating at 60 to 90° C. with 50 gm. 90% aqueous solution of ethylene-diamine and 0.3 gm. sulfur chloride in liquid state, and then treated similarly asi n Example 25. Thus obtained fiber showed dyeability of 90%, when similar dyeing treatment was performed with acid dyestuff "Solar Brill Scarlet 3R." When sulfur chloride was not used, a low dyeability as low as only contamination was obtained. The fastness to light was above the class 5.

*Example 27*

A strong rayon with high resistance to alkali was dipped into 1% caustic soda solution at 20° C. for one hour, and thereafter deliquidation to double the original weight. After the deliquidation, when the reaction was effected at 50° C. for 30 minutes in acrylonitrile, cyanoethyl cellulose fiber was obtained, nitrogen content of which was 5%. Fiber obtained by allowing said fiber to react at 90° C. for one hour with ethylene diamine in the coexistence of a small amount of phosphorous pentasulfide showed a dyeability of a concentrated tint when dyed with "Du Pont Mill Red SUB." When no phosphorous pentasulfide was used, the resulting rayon was impossible to be dyed.

*Example 28*

7.2 gm. polyacrylonitrile powder was reacted for 4 hours on a hot water bath 10 gm. 1,2-diaminopropane containing 2.0 gm. sulfur chloride. The resulting polyvinyl imidazoline was readily soluble in 1,2-diaminopropane. The polyvinyl imidazoline obtained after excess diamine being removed under reduced pressure was a polymer easily soluble both in water and methanol. Particularly the aqueous solution was pasty and had high basicity.

What we claim is:
1. A process for synthesizing a compound selected from the group consisting of imidazoline and bisimidazoline, characterized in that
   a 1,2-diamine selected from the group consisting of ethylenediamine and 1,2-diaminopropane is reacted with
   a compound selected from the group consisting of acetonitrile, propionitrile, benzonitrile, adiponitrile, 1,3-dicyanobenzene and 1,4-dicyanobenzene in the presence of
   a catalyst selected from the group consisting of elementary sulfur and a sulfur-liberating sulfur compound, and
   the amount of the catalyst is at least 0.9% by weight of the weight of the 1,2-diamine.
2. The invention as recited in claim 1 wherein the amount of the catalyst is in the range of between 0.9% and 5% by weight of the weight of the 1,2-diamine.
3. The invention as recited in claim 1 wherein the amount of the catalyst is 1.3% by weight of the weight of the 1,2-diamine.
4. The invention as recited in claim 1 wherein the catalyst consists of sulfur chloride.

References Cited by the Examiner

UNITED STATES PATENTS

| | | | |
|---|---|---|---|
| 2,155,877 | 4/39 | Waldmann et al. | 260—309.6 |
| 2,176,843 | 10/39 | Kranzlein et al. | 260—309.6 |
| 2,505,247 | 4/50 | Isler | 260—309.6 |
| 2,505,248 | 4/50 | Isler et al. | 260—309.6 |
| 2,758,003 | 8/56 | Kleiner et al. | 8—115.5 |
| 2,793,930 | 5/57 | Compton et al. | 8—129 |
| 2,820,691 | 1/58 | Stephens et al. | 8—129 |
| 3,083,070 | 3/63 | Schouteden | 8—115.5 |

OTHER REFERENCES

Ferm et al.: Chemical Reviews, vol. 54, pages 598–99 (1954).

Oxley et al.: Jour. Chem. Soc. (London), 1947, pages 497–505.

WALTER A. MODANCE, *Primary Examiner.*

NORMAN G. TORCHIN, NICHOLAS S. RIZZO,
*Examiners.*